US012209742B1

(12) United States Patent
Wan

(10) Patent No.: US 12,209,742 B1
(45) Date of Patent: Jan. 28, 2025

(54) OUTDOOR WATERPROOF LED LAMP

(71) Applicant: Dongguan Huadeng Lighting Co., Ltd, Dongguan (CN)

(72) Inventor: Huaping Wan, Dongguan (CN)

(73) Assignee: Dongguan Huadeng Lighting Co., Ltd, Dongguan (CN)

( * ) Notice: Subject to any disclaimer, the term of this patent is extended or adjusted under 35 U.S.C. 154(b) by 0 days.

(21) Appl. No.: 18/899,014

(22) Filed: Sep. 27, 2024

(51) Int. Cl.

| | |
|---|---|
| ***F21V 31/00*** | (2006.01) |
| ***F21V 23/02*** | (2006.01) |
| *F21W 131/10* | (2006.01) |
| *F21Y 115/10* | (2016.01) |

(52) U.S. Cl.
CPC .............. *F21V 31/00* (2013.01); *F21V 23/02* (2013.01); *F21W 2131/10* (2013.01); *F21Y 2115/10* (2016.08)

(58) Field of Classification Search
CPC .......... F21V 31/00; F21V 23/02; F21V 23/00; F21Y 2115/10; F21W 2131/10; H01R 13/5219; H01R 13/521; H01R 13/52; H05B 47/00; H05B 47/10
See application file for complete search history.

(56) References Cited

U.S. PATENT DOCUMENTS

| | | | | |
|---|---|---|---|---|
| 8,746,953 B1 * | 6/2014 | Shao | ........................ | F21V 17/06 362/651 |
| 10,753,595 B1 * | 8/2020 | Wan | ........................ | F21V 3/02 |
| 11,125,430 B1 * | 9/2021 | Wu | ........................ | F21V 17/12 |
| 11,231,164 B2 * | 1/2022 | On | ........................ | F21K 9/90 |
| 11,231,172 B1 * | 1/2022 | Wu | ........................ | F21K 9/238 |
| 11,703,215 B2 * | 7/2023 | Li | ........................ | F21K 9/232 362/257 |
| 2018/0128447 A1 * | 5/2018 | Chen | ........................ | F21V 17/16 |
| 2018/0156445 A1 * | 6/2018 | Chen | ........................ | F21V 29/85 |

FOREIGN PATENT DOCUMENTS

| | | |
|---|---|---|
| CN | 210516019 U | 5/2020 |
| CN | 220648018 U | 3/2024 |
| CN | 220931016 U | 5/2024 |

* cited by examiner

*Primary Examiner* — Bao Q Truong
(74) *Attorney, Agent, or Firm* — Nitin Kaushik

(57) ABSTRACT

Disclosed is an outdoor waterproof light emitting diode (LED) lamp. The LED lamp includes a lamp shade, a light source board, an empty cup lamp holder and a plug portion. A resistor is connected onto the light source board, the end, far away from the lamp shade, of the plug portion is provided with an electric conductor, one end of the resistor is electrically connected to the light source board, and the other end of the resistor penetrates the electric conductor and extends to a top end of the plug portion. The electric conductor is provided with a through hole allowing a first pin at one end of the resistor to penetrate, a welding portion is arranged on the through hole in a covered manner, and the welding portion is used for connecting the first pin of the resistor and the electric conductor.

10 Claims, 3 Drawing Sheets

OUTDOOR WATERPROOF LED LAMP

TECHNICAL FIELD

The present disclosure relates to the field of waterproof lamps, and in particular to an outdoor waterproof light emitting diode (LED) lamp.

BACKGROUND

For most of outdoor light emitting diode (LED) lamps, surface mounted device (SMD) light sources or LED filaments are employed. Due to limited heat dissipation conditions, luminous brightness fails to be designed too high, and luminous efficiency is ordinary. The outdoor LED lamps also need to be waterproof. Most of the similar products on the market only do waterproof treatment to lamp shades. Water is likely to seep into gaps between empty cup lamp holders and the lamp shades, and the gaps are places invisible to the naked eye. After long-term use, oxidation corrosion of internal wires of the empty cup lamp holders are likely to be caused, resulting in hidden circuit hazards and maintenance. Although this situation is considered in many waterproof structures, waterproof members are mounted inside the empty cup lamp holders, but the waterproof members may melt or be deformed in the empty cup lamp holders after being damaged due to being heated for a long time, resulting in a poor waterproof effect, and the waterproof members are difficult to remove and replace.

SUMMARY

In order to improve the waterproof capacity of light emitting diode (LED) lamps and prolong service lives of lamp bodies, the present disclosure provides an outdoor waterproof LED lamp.

The present disclosure provides an outdoor waterproof LED lamp, and employs the following technical solutions:

An outdoor waterproof LED lamp includes a lamp shade, a light source board, an empty cup lamp holder and a plug portion, when the plug portion is positioned in the empty cup lamp holder, a peripheral wall of the plug portion abuts against and is attached to an inner peripheral wall of the empty cup lamp holder, and a top wall of the plug portion abuts against the inner bottom wall, away from the lamp shade, of the empty cup lamp holder.

A resistor is connected onto the light source board, the end, far away from the lamp shade, of the plug portion is provided with an electric conductor, one end of the resistor is electrically connected to the light source board, and the other end of the resistor penetrates the electric conductor and extends to a top end of the plug portion. The electric conductor is provided with a through hole allowing a first pin at one end of the resistor to penetrate, a welding portion is arranged on the through hole in a covered manner, and the welding portion is used for connecting the first pin of the resistor and the electric conductor.

The resistor and the electric conductor arranged at two ends of the plug portion are mutually limited to move through the welding portion, such that the resistor is less likely to be separated from the plug portion, and the electric conductor is less likely to be separated from the plug portion. The light source board protrudes out of the empty cup lamp holder, and the plug portion can be pulled out synchronously by pulling the light source board. When the plug portion is damaged, the plug portion can be conveniently replaced, such that the plug portion is easier to maintain and replace, and the stability of fixedly connecting the electric conductor and the resistor on the plug portion and the simplicity of assembly are improved.

The welding portion seals an opening at one end of the through hole, such that water is less likely to flow into the lamp from the through hole. The welding portion can further fix the first pin of the resistor, such that the resistor is stably mounted in a waterproof seat. Moreover, the resistor and the electric conductor are mutually fixed through the welding portion, such that stable conduction between the resistor and the electric conductor can be maintained, and the electric conductor can be further fixed to prevent the electric conductor from be separated from the plug portion, thereby being conductive to improvement on the connection tightness of the whole structure.

Preferably, the light source board is provided with an LED light source, and the LED light source is provided with a chip-on-board (COB) packaging layer, which has better light efficiency and heat dissipation performance than surface mounted device (SMD) lamp beads.

The specific structure of the light source board except for the packaging layer belongs to the prior art, and arrangement positions and connection relationships of lamp beads, printed circuit boards (PCB) and rectifiers contained in the light source board are not described in detail.

Preferably, the welding portion is of a tin bead.

Preferably, the empty cup lamp holder is in threaded connection to an end portion of the lamp shade, such that a waterproof ring arranged on a bottom surface of the plug portion abuts against an inner surface of the empty cup lamp holder.

The waterproof ring is pushed to move by the connection between the empty cup lamp holder and the lamp shade, such that the waterproof ring is clamped between the hollow cup lamp holder and the lamp shade, a connection gap between the empty cup lamp holder and the lamp shade is further sealed, and the waterproof capacity of the whole waterproof lamp is stronger.

Preferably, the plug portion is provided with an insertion hole, and the resistor is partially inserted into the insertion hole. The plug portion is of a soft rubber plug, and the resistor is in interference fit with the insertion hole.

The resistor is fixed through the interference fit between the rubber plug and the resistor, such that fixing operation of the resistor is simple and convenient.

Preferably, the plug portion is further provided with a connection hole, the connection hole is in communication with an insertion hole, and the electric conductor is inserted into the connection hole and abuts against an inner side wall of the connection hole.

The connection hole and the insertion hole can cooperate and guide the first pin of the resistor, such that the first pin of the resistor can penetrate the electric conductor more easily, and the resistor can be assembled on the plug portion more easily. Moreover, the electric conductor can be prefixed, and mounting and cooperation between the electric conductor and the plug portion can be operated more easily.

Preferably, the electric conductor includes an insertion post and a copper cap, a side wall of the insertion post is in interference fit with a hole wall of the connection hole, and a diameter of the copper cap is larger than that of the connection hole.

The copper cap limits a depth of the portion, inserted into the plug portion, of the electric conductor, which facilitates subsequent mounting.

Preferably, the side, away from the insertion post, of the copper cap is recessed to form a limiting groove.

During welding, solder melts and then flows to the limiting groove, which is conductive to provision of welding assistance, such that the connection among the welding portion, the first pin and the electric conductor is stabler after welding.

Preferably, an electrode L and an electrode N are connected onto the light source board, and the electrode N extends out of the lamp shade and is relatively independent from the electrode L located in the lamp shade.

Preferably, the surface of the portion, adjacent to an interior of the lamp shade, of the plug portion is provided with a mounting hole for positioning the light source board having the electrode L and the electrode N.

Preferably, the electrode N is folded onto a head of the lamp shade by means of bending.

Preferably, the first pin, away from the welding portion, of the resistor is fixed to the electrode L through welding.

To sum up, the present invention has the following beneficial technical effects:

In the technical solution of the present disclosure, the resistor and the electric conductor arranged at two ends of the plug portion are mutually limited to move through the welding portion, such that the resistor is less likely to be separated from the plug portion, the electric conductor is less likely to be separated from the plug portion, and the stability of fixedly connecting the electric conductor and the resistor on the plug portion and the simplicity of assembly can be improved.

Figure 1:
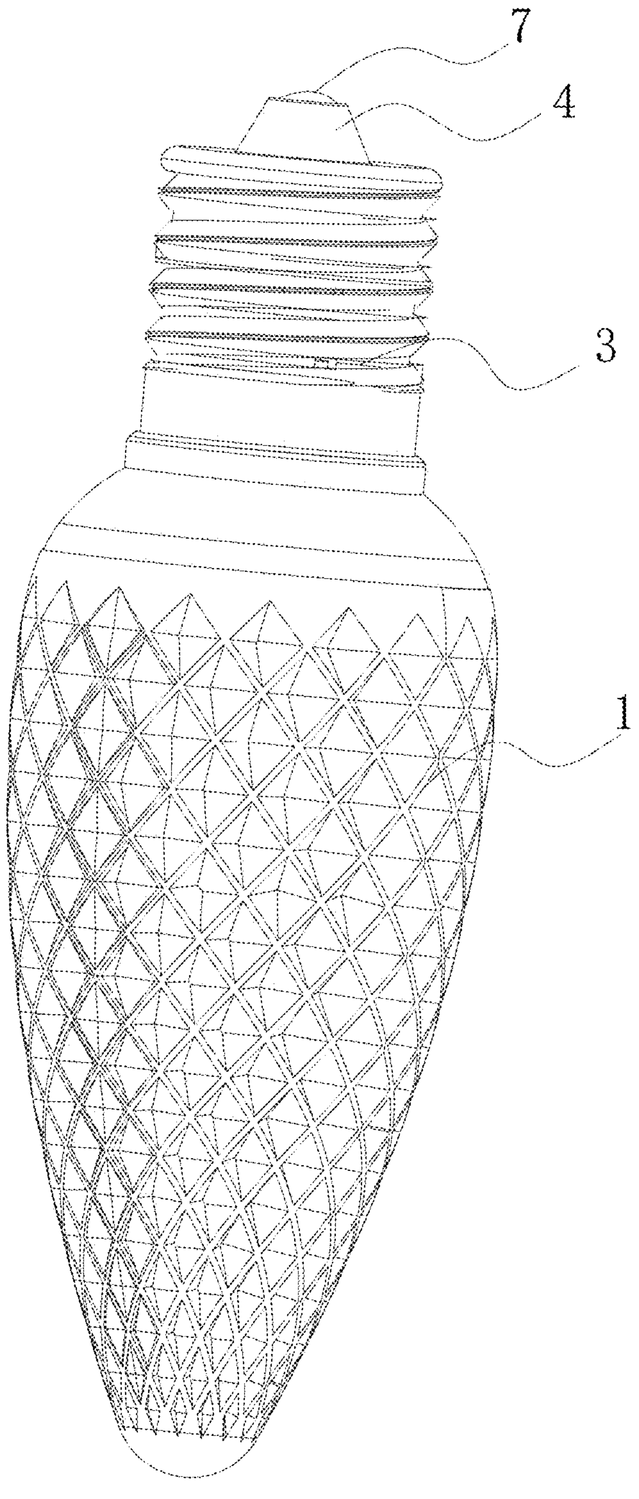
FIG. 1 is a schematic diagram of an integral structure of an outdoor waterproof LED lamp of the present disclosure.

Description of reference numerals: 1. lamp shade; 2. light source board; 3. empty cup lamp holder; 4. plug portion; 5. resistor; 6. electric conductor; 7. welding portion; 8. through hole; 9. waterproof ring; 10. insertion hole; 11. connection hole; 12. insertion post; 13. copper cap; 14. limiting groove; 15. electrode L; 16. electrode N; 17. mounting hole; 18. first pin; and 19. second pin.

DETAILED DESCRIPTION OF THE EMBODIMENTS

The present disclosure will be further described in detail with reference to FIGS. 1-3.

An outdoor waterproof light emitting diode (LED) lamp is disclosed in the examples of the present disclosure.

Figure 2:
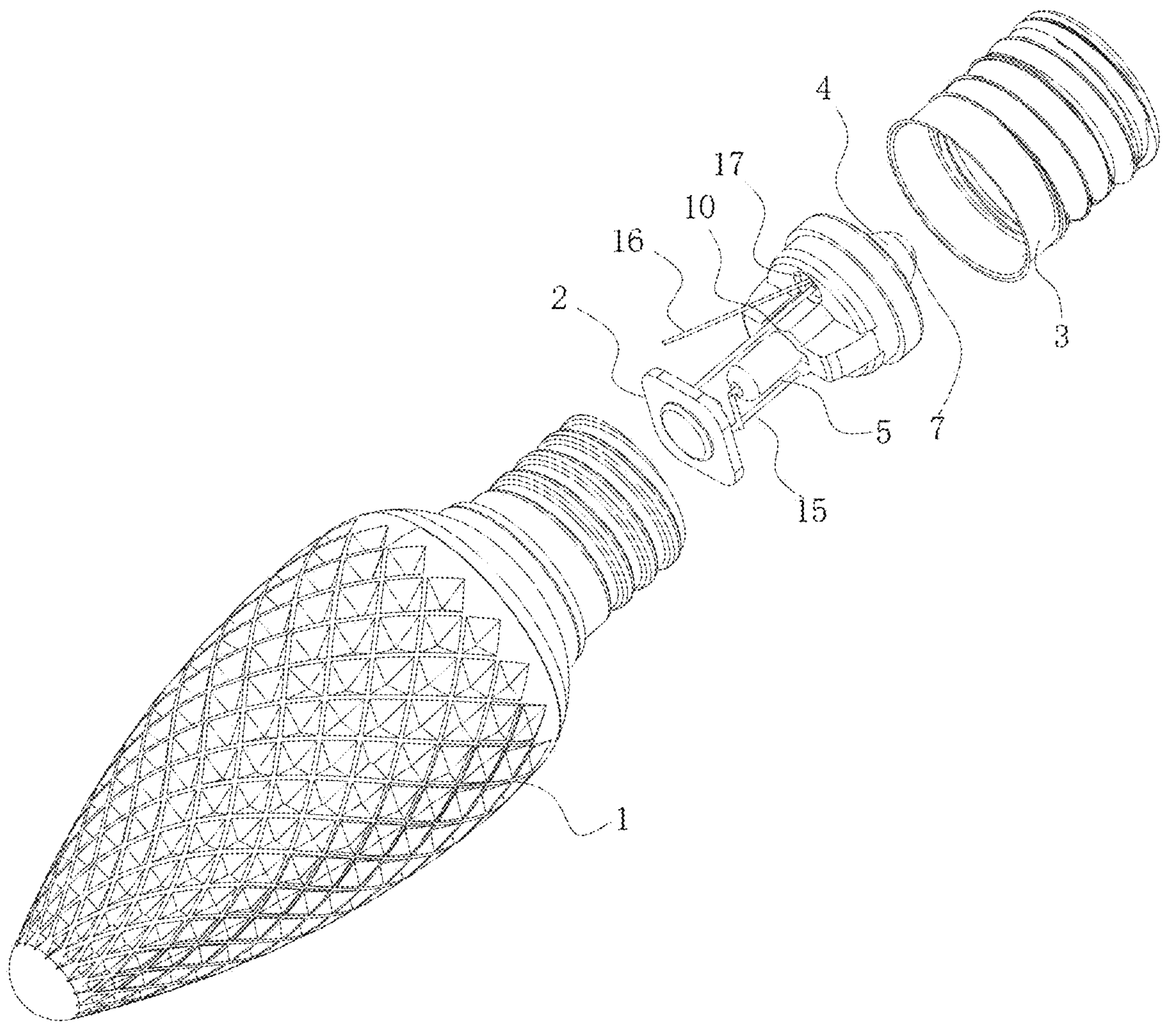
FIG. 2 is an exploded diagram of an outdoor waterproof LED lamp of the present disclosure.

Referring to FIGS. 1 and 2, an outdoor waterproof LED lamp includes a lamp shade 1, a light source board 2, an empty cup lamp holder 3 and a plug portion 4. When the plug portion 4 is positioned in the empty cup lamp holder 3, a peripheral wall of the plug portion 4 abuts against and is attached to an inner peripheral wall of the empty cup lamp holder 3, and a top wall of the plug portion 4 abuts against the inner bottom wall, away from the lamp shade 1, of the empty cup lamp holder 3.

A resistor 5 is connected onto the light source board 2, the end, far away from the lamp shade 1, of the plug portion 4 is provided with an electric conductor 6, one end of the resistor 5 is electrically connected to the light source board 2, and the other end of the resistor penetrates the electric conductor 6 and extends to a top end of the plug portion 4. The electric conductor 6 is provided with a through hole 8 allowing a first pin 18 at one end of the resistor 5 to penetrate, a welding portion 7 is arranged on the through hole 8 in a covered manner, and the welding portion 7 is used for connecting the first pin 18 of the resistor 5 and the electric conductor 6.

The resistor 5 and the electric conductor 6 arranged at two ends of the plug portion 4 are mutually limited to move through the welding portion 7, such that the resistor 5 is less likely to be separated from the plug portion 4, and the electric conductor 6 is less likely to be separated from the plug portion 4, thereby improving the stability of fixedly connecting the electric conductor 6 and the resistor 5 on the plug portion 4 and the simplicity of assembly.

The welding portion 7 seals an opening at one end of the through hole 8, such that water is less likely to flow into the lamp from the through hole 8. The welding portion 7 can further fix the first pin 18 of the resistor 5, such that the resistor 5 is stably mounted in a waterproof seat. Moreover, the resistor 5 and the electric conductor 6 are mutually fixed through the welding portion 7, such that stable conduction between the resistor 5 and the electric conductor 6 can be maintained, and the electric conductor 6 can be further fixed to prevent the electric conductor 6 from be separated from the plug portion, thereby being conductive to improvement on the connection tightness of the whole structure.

In the Patent with No. 202320717401.3, since the electric conductor 6 will eventually be exposed outside the empty cup lamp holder 3, in order to ensure the stability of waterproofness, the conduction mode between the electric conductor 6 and the resistor 5 is to make end portions of the two abut together. In order to maintain stable conduction between the two, many structures are provided to prevent the two from separating, resulting in a very complicated structure. According to the solution, the through hole 8 through which the first pin 18 of the resistor 5 passes is sealed by the welding portion 7, such that stable conduction between the resistor 5 and the electric conductor 6 is ensured, the overall structure can be simplified, and each part is easier to machine and form.

The light source board is provided with an LED light source the LED light source is provided with a chip-on-board (COB) packaging layer, which has better light efficiency and heat dissipation performance than surface mounted device (SMD) lamp beads.

The specific structure of the light source board except for the packaging layer belongs to the prior art, and arrangement positions and connection relationships of lamp beads, printed circuit boards (PCB) and rectifiers contained in the light source board are not described in detail.

Figure 3:
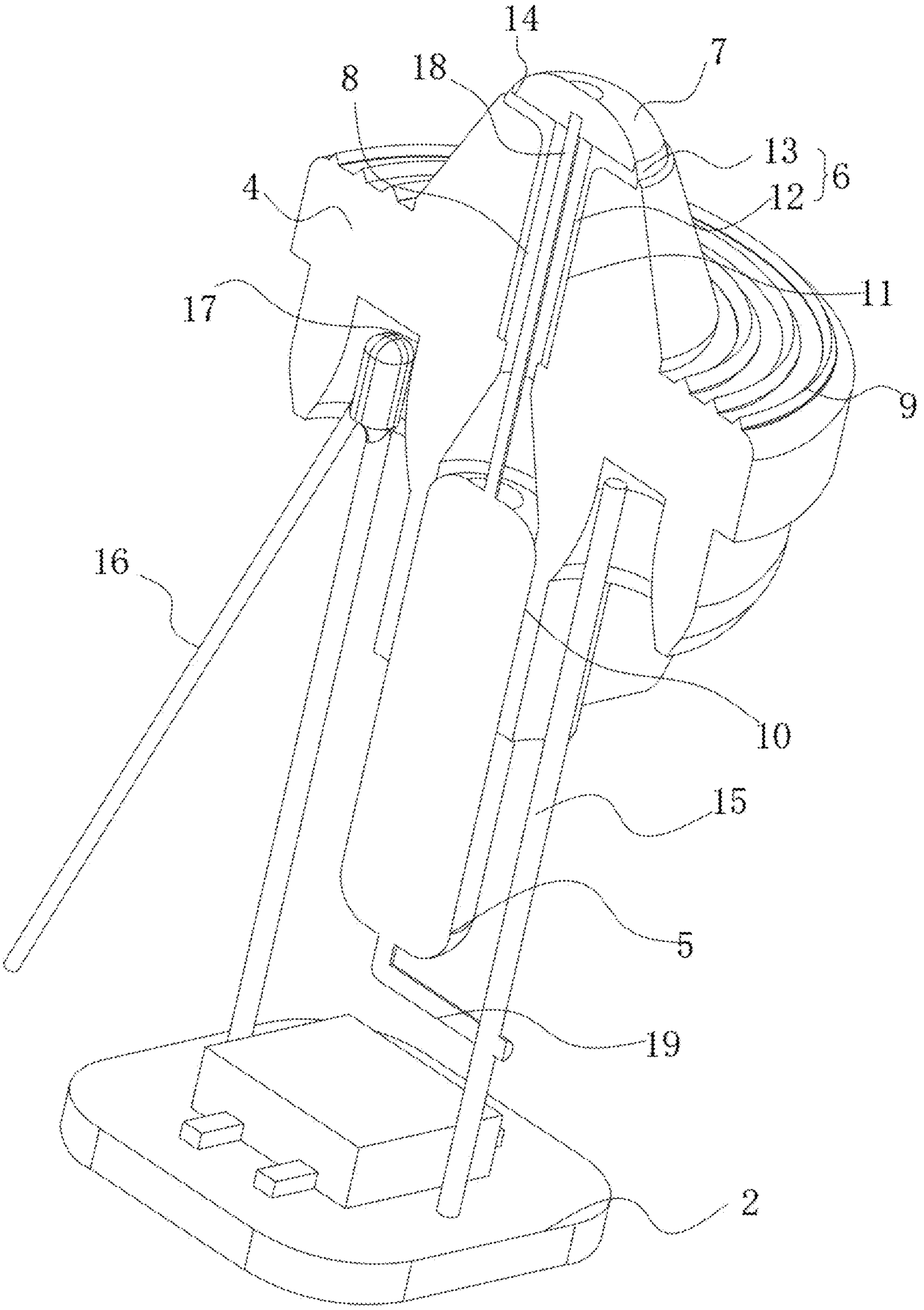
FIG. 3 is a partially sectional view of an outdoor waterproof LED lamp of the present disclosure.

Referring to FIGS. 2 and 3, in this example, the welding portion 7 is of a tin bead.

Referring to FIGS. 2 and 3, in this example, the empty cup lamp holder 3 is in threaded connection to an end portion of the lamp shade 1, such that a waterproof ring 9 arranged on a bottom surface of the plug portion 4 abuts against an inner surface of the empty cup lamp holder 3.

Referring to FIGS. 2 and 3, in this example, the plug portion 4 is provided with an insertion hole 10, and the resistor 5 is partially inserted into the insertion hole 10. The plug portion 4 is of a soft rubber plug, and the resistor 5 is in interference fit with the insertion hole 10.

The resistor 5 is fixed through the interference fit between the rubber plug and the resistor 5, such that fixing operation of the resistor 5 is simple and convenient.

Referring to FIGS. 2 and 3, in this example, the plug portion 4 is further provided with a connection hole 11, the connection hole 11 is in communication with an insertion hole 10, and the electric conductor 6 is inserted into the connection hole 11 and abuts against an inner side wall of the connection hole.

The connection hole 11 and the insertion hole 10 can cooperate and guide the first pin 18 of the resistor 5, such that the first pin 18 of the resistor 5 can penetrate the electric conductor 6 more easily, and the resistor 5 can be assembled on the plug portion 4 more easily. Moreover, the electric conductor 6 can be pre-fixed, and mounting and cooperation between the electric conductor 6 and the plug portion 4 can be operated more easily.

Referring to FIGS. 2 and 3, in this example, the electric conductor 6 includes an insertion post 12 and a copper cap 13, a side wall of the insertion post 12 is in interference fit with a hole wall of the connection hole 11, and a diameter of the copper cap 13 is larger than that of the connection hole 11.

The copper cap 13 limits a depth of the portion, inserted into the plug portion 4, of the electric conductor 6, which facilitates subsequent mounting.

Referring to FIGS. 2 and 3, in this example, the side, away from the insertion post 12, of the copper cap 13 is recessed to form a limiting groove 14.

During welding, solder melts and then flows to the limiting groove 14, which is conductive to provision of welding assistance, such that the connection among the welding portion 7, the first pin 18 and the electric conductor 6 is stabler after welding.

Referring to FIGS. 2 and 3, in this example, an electrode L 15 and an electrode N 16 are connected onto the light source board 2, and the electrode N 16 extends out of the lamp shade 1 and is relatively independent from the electrode L 15 located in the lamp shade 1.

The plug portion 4, the electrode L 15, the electrode N 16 and the light source board 2 have multiple sizes and can adapt to various types of LED lamps which include but not limited to C7, C9, G30, G40, G50 and S14.

Referring to FIGS. 2 and 3, in this example, the surface of the portion, adjacent to an interior of the lamp shade 1, of the plug portion 4 is provided with a mounting hole 17 for positioning the light source board 2 having the electrode L 15 and the electrode N 16.

Referring to FIGS. 2 and 3, in this example, the electrode N 16 is folded onto a head of the lamp shade 1 by means of bending.

The electrode N 16 is folded onto an outer peripheral surface of the head, and when the empty cup lamp holder 3 is in threaded connection to the outer peripheral surface of the head of the lamp shade 1, the folded portion of the electrode N 16 is limited between the connection of the empty cup lamp holder 3 and the lamp shade 1. After the connection is completed, the waterproof ring 9 is in tight contact with an inner surface of the empty cup lamp holder 3 to achieve the purpose of waterproofness and sealing inside the empty cup lamp holder 3 is realized.

Referring to FIGS. 2 and 3, in this example, a second pin 19 of the resistor 5 is fixed to the electrode L 15 through welding.

The above are only preferred examples of the present disclosure and are not intended to limit the protection scope of the present disclosure. Therefore, equivalent changes made according to the structure, shape and principle of the present disclosure should fall within the protection scope of the present disclosure.

What is claimed is:

1. An outdoor waterproof light emitting diode (LED) lamp, comprising a lamp shade, a light source board, an empty cup lamp holder and a plug portion, wherein when the plug portion is positioned in the empty cup lamp holder, a peripheral wall of the plug portion abuts against and is attached to an inner peripheral wall of the empty cup lamp holder, and a top wall of the plug portion abuts against the inner bottom wall, away from the lamp shade, of the empty cup lamp holder; and a resistor is connected onto the light source board, the end, far away from the lamp shade, of the plug portion is provided with an electric conductor, one end of the resistor is electrically connected to the light source board, the other end of the resistor penetrates the electric conductor and extends to a top end of the plug portion, the electric conductor is provided with a through hole allowing a first pin at one end of the resistor to penetrate, a welding portion is arranged on the through hole in a covered manner, and the welding portion is used for connecting the first pin of the resistor and the electric conductor.

2. The outdoor waterproof LED lamp according to claim 1, wherein the plug portion is further provided with a connection hole, the connection hole is in communication with an insertion hole, and the electric conductor is inserted into the connection hole and abuts against an inner side wall of the connection hole.

3. The outdoor waterproof LED lamp according to claim 2, wherein the electric conductor comprises an insertion post and a copper cap, a side wall of the insertion post is in interference fit with a hole wall of the connection hole, and a diameter of the copper cap is larger than that of the connection hole.

4. The outdoor waterproof LED lamp according to claim 3, wherein the side, away from the insertion post, of the copper cap is recessed to form a limiting groove.

5. The outdoor waterproof LED lamp according to claim 2, wherein the plug portion is provided with the insertion hole, the resistor is partially inserted into the insertion hole, the plug portion is of a soft rubber plug, and the resistor is in interference fit with the insertion hole.

6. The outdoor waterproof LED lamp according to claim 5, wherein the empty cup lamp holder is in threaded connection to an end portion of the lamp shade, such that a waterproof ring arranged on a bottom surface of the plug portion abuts against an inner surface of the empty cup lamp holder.

7. The outdoor waterproof LED lamp according to claim 1, wherein an electrode L and an electrode N are connected onto the light source board, and the electrode N extends out of the lamp shade and is relatively independent from the electrode L located in the lamp shade.

8. The outdoor waterproof LED lamp according to claim 7, wherein an LED light source is arranged on the light source board, and the LED light source is provided with a chip-on-board (COB) packaging layer.

9. The outdoor waterproof LED lamp according to claim 7, wherein the surface of the portion, adjacent to an interior of the lamp shade, of the plug portion is provided with a mounting hole for positioning the light source board 2 having the electrode L and the electrode N, and the electrode N is folded onto a head of the lamp shade by means of bending.

10. The outdoor waterproof LED lamp according to claim 9, wherein sizes of the plug portion, the electrode L, the electrode N and the light source board are capable of adapting to various types of LED lamps, and the types of LED lamps comprise but are not limited to C7, C9, G30, G40, G50 and S14.

* * * * *